(12) United States Patent
Mascarell et al.

(10) Patent No.: US 8,810,055 B2
(45) Date of Patent: Aug. 19, 2014

(54) WIND TURBINE CONTROL METHODS AND SYSTEMS

(75) Inventors: Octavio Hernandez Mascarell, Madrid (ES); Jose Maria Lopez Rubio, Madrid (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 233 days.

(21) Appl. No.: 13/357,696

(22) Filed: Jan. 25, 2012

(65) Prior Publication Data

US 2012/0193918 A1 Aug. 2, 2012

(30) Foreign Application Priority Data

Jan. 31, 2011 (ES) .................... 201100090

(51) Int. Cl.
*F03D 9/00* (2006.01)
*F03D 7/02* (2006.01)
(52) U.S. Cl.
CPC ......... *F03D 7/0276* (2013.01); *F05B 2270/322* (2013.01); *Y02E 10/723* (2013.01)
USPC ............................................ 290/44; 290/55

(58) Field of Classification Search
CPC ....... F03D 7/0224; F03D 7/028; F03D 7/046; F05B 2270/32; F05B 2270/327; F05B 2270/328; F05B 2270/1016
USPC ....................................................... 290/44, 55
See application file for complete search history.

(56) References Cited

U.S. PATENT DOCUMENTS

| | | | |
|---|---|---|---|
| 4,193,005 A * | 3/1980 | Kos et al. | 290/44 |
| 8,174,136 B2 * | 5/2012 | Johnson et al. | 290/44 |
| 8,478,449 B2 * | 7/2013 | Hernandez Mascarell | 700/287 |
| 2009/0224542 A1* | 9/2009 | Nim | 290/44 |
| 2010/0135789 A1* | 6/2010 | Zheng et al. | 416/1 |
| 2011/0089693 A1* | 4/2011 | Nasiri | 290/44 |

* cited by examiner

*Primary Examiner* — Tho D Ta
(74) *Attorney, Agent, or Firm* — Ladas & Parry LLP

(57) ABSTRACT

Improved wind turbine control methods and systems. The invention relates to a method for the operation of a variable speed wind turbine having pitch and torque control means that include additional steps for providing to the pitch control means in case of a wind gust a pitch angle reference increment DΘref in the amount needed for avoiding that the aerodynamic torque added by the wind gust exceeds a predetermined limit. The present invention also relates to a wind turbine comprising a control system arranged for performing an additional regulation in case of wind gust.

5 Claims, 3 Drawing Sheets

WIND TURBINE CONTROL METHODS AND SYSTEMS

FIELD OF THE INVENTION

The invention relates to improved wind turbine control methods and systems and in particular to improved wind turbine control methods and systems for limiting over speeds due to wind gusts.

BACKGROUND

The damaging effects of wind gusts in wind turbines are well known in the art. If the wind speed increases in a small interval of time the generator speed may exceed its allowed limits because the WT controller is not able to generate a fast enough reaction, and this can cause potential damaging effects for the generator and other wind turbine components.

In the case of an extreme operating gust which also produces extreme loads on main structural components such as the blade root and the tower bottom a typical solution is shutting down the wind turbine. In this respect WO 2004/077068 describes the use of lidar means for detecting gusts well before the wind change reaches the turbine tower so that the blades could be feathered using the pitch control means.

A known approach for coping with wind gusts is using the generator torque control means for avoiding over-speed problems. However this technique involves risks of causing huge loads in several wind turbine components.

Another approach disclosed for example in U.S. Pat. No. 7,342,323 is based in sensing the wind speed at a desired distance from the wind turbine generator and controlling the pitch of the blades of the wind turbine using said "advanced" information of the wind speed. However the complexity and the lack of robustness of this technique raise reliability problems.

WO 2007/138138 in the name of the applicant discloses a solution for an extreme operating gust that keeps the wind turbine in operation and minimizes the bending moments carrying out a sudden increase of the pitch angle by saturating the minimum pitch rate value when the extreme operating gust is detected. This technique is applicable to a very particular case of wind gust.

The present invention focuses on finding a solution for these drawbacks.

SUMMARY OF THE INVENTION

It is an object of the present invention to provide reliable wind turbine control methods and systems for limiting over speeds due to wind gusts.

It is another object of the present invention to provide wind turbine control methods and systems for limiting over speeds due to wind gusts able to react quickly to them without a wind speed measure in advanced and keeping the windturbine producing.

In one aspect these and another objects are met by a method for the operation of a variable speed wind turbine having pitch and torque control means that include additional steps for providing to the pitch control means in case of a wind gust a pitch angle reference increment $\Delta\theta_{ref}$ in the amount needed for avoiding that the aerodynamic torque added by the wind gust exceeds a predetermined limit and increases the rotor speed and so the generator speed.

In embodiments of the present invention said pitch angle reference increment $\Delta\theta_{ref}$ is provided/removed to/from the pitch control means depending on the value of a switch indicating the presence/absence of a wind gust depending on at least the values of the generator acceleration A and the generator speed $\Omega$. Therefore the method includes separated steps for calculating the pitch angle reference increment $\Delta\theta_{ref}$ needed for counteracting an aerodynamic torque excess due to a "possible" wind gust and for detecting the presence/absence of a wind gust according to predefined conditions of generator acceleration and generator velocity (and even an additional user-defined condition) so that said the calculated pitch angle reference increment $\Delta\theta_{ref}$ is only applied when said switch is On. This allows on one side a fast reaction to wind gusts and on the other side avoids unnecessary reactions in certain wind turbulent conditions.

In embodiments of the present invention said pitch angle reference increment $\Delta\theta_{ref}$ is determined as a function of at least the aerodynamic torque excess $T_{exc}$ due to the wind gust (the product of the generator acceleration and the total moment of inertia) and the torque sensitivity to the pitch angle $T_{sens}$ (calculated from a given table obtained from static simulation because it is a variable depending on many physical features of the wind turbine). Therefore the pitching action for reacting to wind gusts is made dependant not only on a wind gust depending variable (the generator acceleration) but also on physical features of the wind turbine so that a more controlled reaction to wind gusts can be achieved.

In embodiments of the present invention said pitch angle reference increment $\Delta\theta_{ref}$ is also determined taking into account the expected generator speed increment $\Delta\Omega$ due to the wind gust and the closeness of the generator speed $\Omega$ to a predetermined threshold value. Therefore additional variables are used for controlling the pitching action reaction to those wind gusts that can lead the wind turbine close to its operating limits.

In another aspect, the above mentioned objects are met by a wind turbine comprising: a tower and a nacelle housing, a generator driven by a wind rotor formed by a rotor hub and one or more blades; measuring devices of at least the generator speed $\Omega$ and the pitch angle $\theta$ of each blade; a control system connected to said measuring devices and to at least pitch and torque control actuators, the control system being arranged for performing a regulation of the wind turbine according to a predetermined power curve for wind speeds below the cut-out wind speed $V_{out}$; the control system being also arranged for performing an additional regulation for wind gusts events providing to the pitch control means a pitch angle reference increment $\Delta\theta_{ref}$ in the amount needed for avoiding that the aerodynamic torque added by a wind gust exceeds a predetermined limit, said additional regulation being enabled when a wind gust according to predefined conditions takes place and disabled when said wind gust ends.

In embodiments of the present invention the control system arrangement for performing said additional regulation comprises a module for obtaining said pitch angle reference increment $\Delta\theta_{ref}$ and a switch Sw for enabling/disabling said additional regulation having: a first sub-module for calculating the generator acceleration A and the generator acceleration reference $A_{ref}$ depending respectively on the filtered generator speed $\Omega$ and the generator speed reference $\Omega_{ref}$ used by the wind turbine pitch control means; a second sub-module for calculating the excess of aerodynamic torque $T_{exc}$ added by the wind gust and the required pitch angle reference increment $\Delta\theta_{req}$ to overcome said excess depending on at least the mean value of the measured pitch angles $\theta_{mean}$ and the wind turbine inertia; a third sub-module for calculating the expected generator speed increment $\Delta\Omega$ assuming that the blades will pitch at the maximum allowable speed; a fourth sub-module for calculating a weighting factor G to be applied to the required pitch angle reference increment $\Delta\theta_{req}$ depending on the expected generator speed increment $\Delta\Omega$ and the closeness of the generator speed $\Omega$ to a threshold value; a fifth sub-module for calculating the enabling/disabling switch depending on at least the generator speed $\Omega$ and the generator acceleration A; a sixth sub-module for calculating the pitch angle reference increment $\Delta\theta_{ref}$ to be provided to the pitch control means.

Therefore the implementation of the additional regulation according to the present invention is done using, on the one side, available signals at the wind turbine control system and, on the other side, dependant variables of said signals easy to obtain and configuration parameters regarding relevant physical features of the wind turbine. This allows a simple and robust implementation of said additional regulation.

Other features and advantages of the present invention will be understood from the following detailed description of illustrative and by no means limiting embodiments of its object in relation with the enclosed drawings.

DETAILED DESCRIPTION OF PREFERRED EMBODIMENTS

Figure 1:
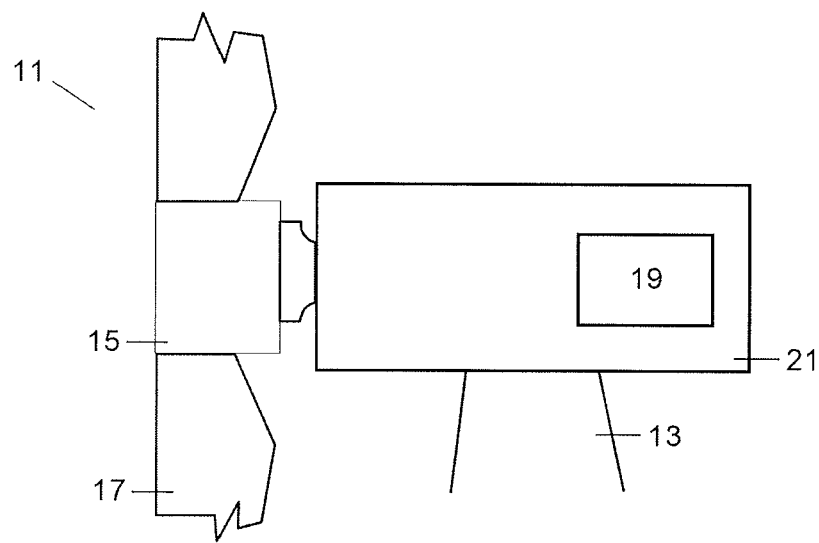
FIG. 1 is a schematic section side view of a wind turbine.

A typical wind turbine 11 comprises a tower 13 supporting a nacelle 21 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The wind turbine power output is typically controlled by means of a control system for regulating the pitch angle of the rotor blades and the generator torque. The rotor rotational speed and power output of the wind turbine can hereby be initially controlled.

Figure 2:
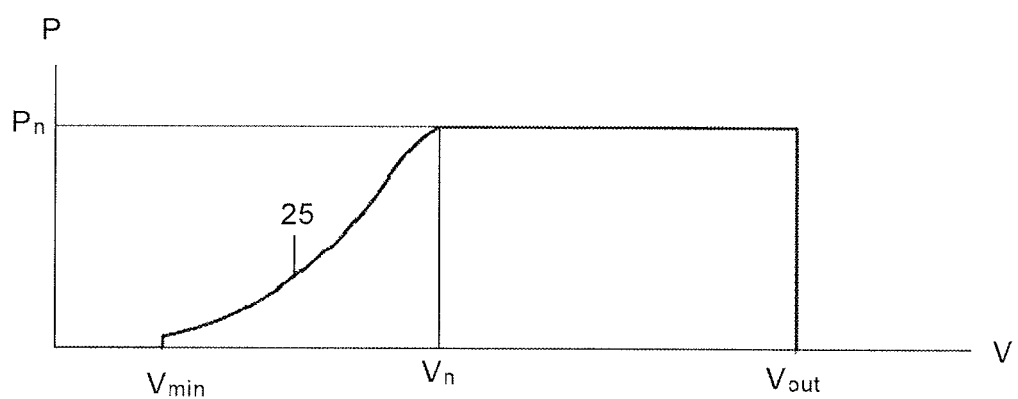
FIG. 2 shows a typical power curve of a wind turbine.

Below the cut-out wind speed $V_{out}$ the wind turbine control system is arranged to regulate the power production according to a curve which defines the desired functional relationship between power and speed to achieve ideal output. A curve of this type is curve 25 in FIG. 2 showing that the power production P increases from a minimum wind speed $V_{min}$ to the nominal wind speed $V_n$ and then remain constant in the nominal power value $P_n$ up to the cut-out wind speed $V_{out}$ where decreases up to 0.

For implementing said regulation a control unit receives input data such as wind speed V, generator speed $\Omega$, pitch angle $\theta$, power P from well known measuring devices and send output data $\theta_{ref}$, $T_{ref}$ to, respectively, the pitch actuator system for changing the angular position of the blades 17 and to a generator command unit for changing the reference for the power production.

According to the present invention the control system is also arranged for performing an additional regulation in case of wind gusts (i.e. a regulation that is enabled when a wind gust is detected and that is disabled when the wind gust ends) that increases the pitch angle reference $\theta_{ref}$ to be provided to the pitch actuator of the blades in the amount needed for avoiding that the aerodynamic torque added by the wind gust exceeds a predetermined limit.

Figure 3:
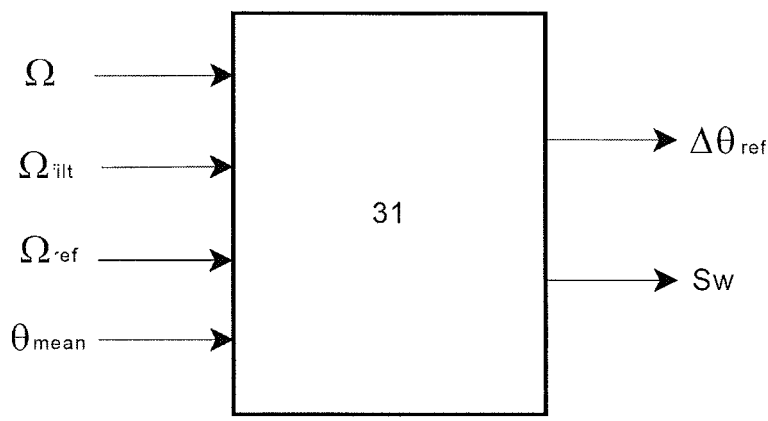
FIG. 3 is a schematic block diagram of the additional regulation according to the present invention.

As shown in FIG. 3 the basic inputs to the control unit 31 that implements said additional regulation are the following ones: the generator speed $\Omega$, the filtered generator speed $\Omega_{fil}$ used in the pitch controller, the generator speed reference $\Omega_{ref}$ generated by the pitch controller and the mean pitch angle $\theta_{mean}$ (a non filtered mean value of the measured blade pitch angles). The outputs are the increment of the pitch angle reference $\Delta\theta_{ref}$ to be provided to the pitch actuator system and a switch Sw for enabling/disabling the additional pitch angle regulation.

Said control unit 31 comprises a module implementing a suitable algorithm for determining the increment of the pitch angle reference $\Delta\theta_{ref}$ in the amount needed for avoiding that the aerodynamic torque added by the wind gust exceeds a predetermined limit.

In a preferred embodiment said algorithm is implemented by means of the sub-modules shown in FIGS. 4 to 9.

Figure 4:
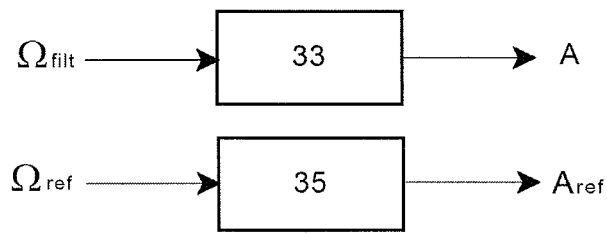
FIGS. 4-9 are detailed block diagrams of an embodiment of the additional regulation according to the present invention.

In the first sub-module shown in FIG. 4 the generator acceleration A is calculated in block 33 as the derivative of the generator speed $\Omega_{fil}$. The generator acceleration reference $A_{ref}$ is also calculated in block 35 as the derivative of the generator speed reference $\Omega_{ref}$.

Figure 5:
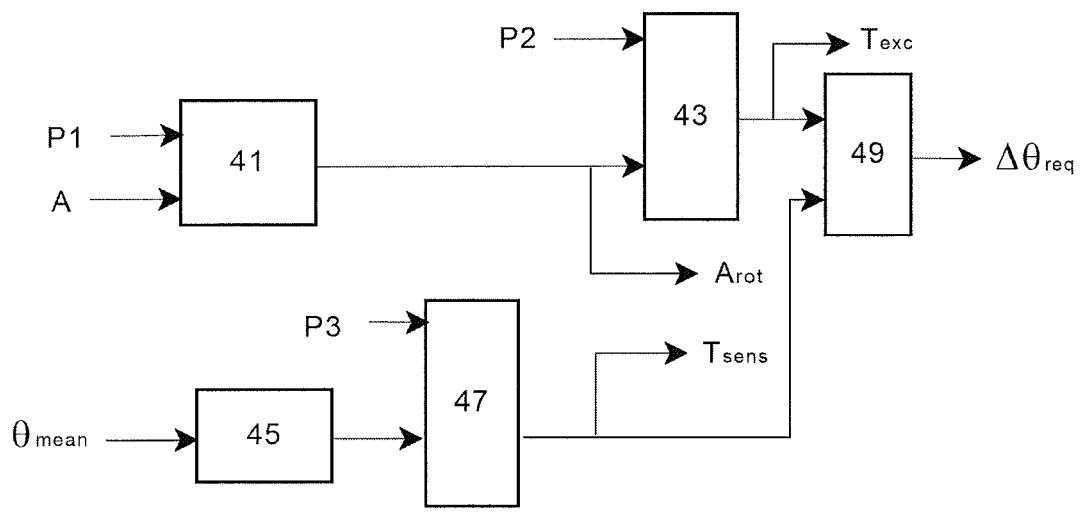

In the second sub-module shown in FIG. 5 the excess of aerodynamic torque $T_{exc}$ and the required pitch angle increment $\Delta\theta_{req}$ for limiting said excess are calculated.

The excess of aerodynamic torque $T_{exc}$ is calculated (block 43) as the product of the rotor acceleration $A_{rot}$ and the total moment of inertia P2. The rotor acceleration $A_{rot}$ is calculated (block 41) from the generator acceleration A and the drive train multiplication ratio P1.

A torque sensitivity $T_{sens}$ for the mean value of the measured pitch angles $\theta_{mean}$ is calculated (block 47) from a reference sensitivity parameter P3 and an additional factor (block 45) depending of $\theta_{mean}$ that corrects the non linear sensitivity of torque to pitch angle.

From the excess of aerodynamic torque $T_{exc}$ and the torque sensitivity $T_{sens}$ the required increment of the pitch angle increment $\Delta\theta_{req}$ is derived (block 49). This is, then, the necessary pitch increment in order to maintain the current aerodynamic torque.

Figure 6:
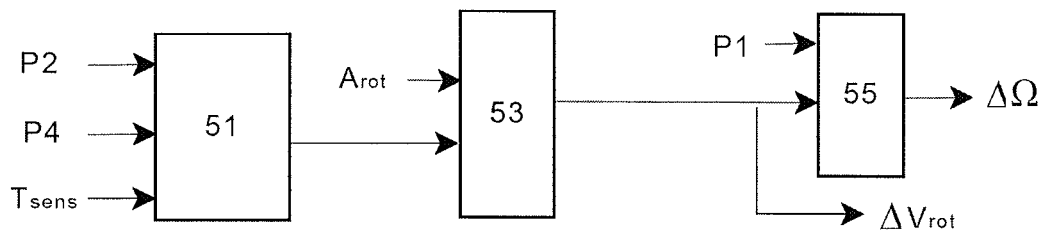

In the third sub-module shown in FIG. 6 the rotor and generator over-speed increments $\Delta V_{rot}$, $\Delta\Omega$ due to the wind gust are calculated assuming that the blades will pitch at the maximum allowable speed P4. Said increments are calculated (blocks 53, 55) from the rotor acceleration $A_{rot}$ and the deceleration derivative imposed by the maximum allowable speed P4 which value (block 51) is directly proportional to the torque sensitivity $T_{sens}$, to the maximum allowable speed P4 and inversely proportional to the total moment of inertia of the rotor P2.

Figure 7:
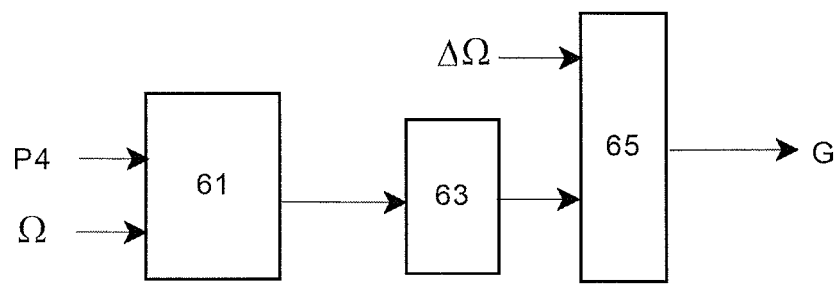

In the fourth sub-module shown in FIG. 7 is calculated a weighting factor G of the required increment of the pitch angle increment $\Delta\theta_{req}$ depending on the expected generator over-speed increment $\Delta\Omega$ due to the wind gust and to the generator speed $\Omega$ closeness to a generator over-speed shut-down threshold P4 (blocks 61, 63, 65). The weighting factor G is greater the higher the expected generator over-speed increment $\Delta\Omega$ is. The weighting factor G is also greater the closer the generator speed $\Omega$ is from generator over-speed shut-down threshold P4.

Figure 8:
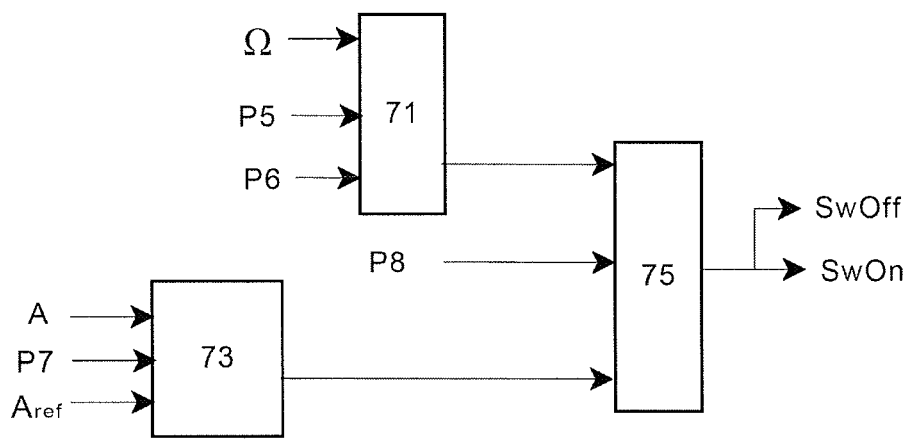
Figure 9:
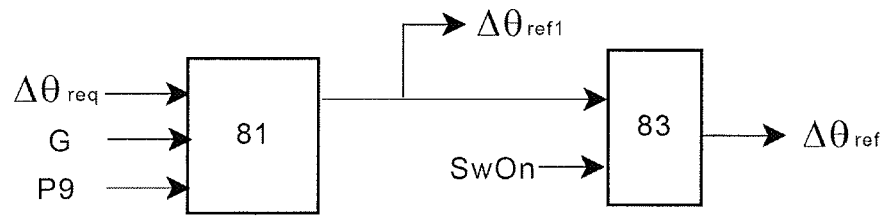

In the fifth sub-module shown in FIG. 8 is calculated (block 75) a switch for enabling/disabling the algorithm in order to limit its actuation. In this respect three conditions are taken into account.

The first condition (block 71) is that the generator speed Ω is higher than a threshold value P6 below the rated generator speed value P5 for enabling the algorithm.

The second condition (block 73) is that the generator acceleration A is higher than a threshold value P7 for avoid enabling the algorithm at start-up processes. The generator acceleration reference $A_{ref}$ is also considered.

The third condition is a user defined parameter P8 for enabling/disabling the algorithm.

Finally in the sixth sub-module shown in FIG. 8 the pitch angle increment $\Delta\theta_{ref}$ is calculated (block 81) applying the weighting factor G and a user defined factor P9 to the required pitch angle increment $\Delta\theta_{req}$. If the switch for enabling/disabling the algorithm is On, then the pitch angle increment $\Delta\theta_{ref}$ is provided to the pitch controller (block 83).

The main distinguishing features of the wind gust regulation according to present invention with respect to the prior art are the following:

- It only uses measured values of the generator speed Ω and blade pitch angle θ which are reliable signals available at the wind turbine. It does not use wind measures provided by the wind turbine anemometer or by other devices placed in the wind turbine or outside the wind turbine for measuring the wind because they provide delayed measures or measures lacking robustness.
- It takes into account the wind turbine physics, i.e. the wind turbine aerodynamics and mechanics. Aerodynamic torque received by the wind turbine depends on rotor aerodynamics. Similarly, the wind turbine acceleration and hence the over-speed is inversely proportional to the wind turbine inertia.
- It allows that the control means can react quickly to wind gusts and keep the wind turbine producing energy in a safe mode.

Although the present invention has been fully described in connection with preferred embodiments, it is evident that modifications may be introduced within the scope thereof, not considering this as limited by these embodiments, but by the contents of the following claims.

The invention claimed is:

1. A method for the operation of a variable-speed wind turbine having pitch and torque control means, wherein when a wind gust according to predefined conditions takes place, a control system of the wind turbine includes additional steps for providing to the pitch control means a pitch angle reference increment $\Delta\theta_{ref}$ in the amount needed for avoiding that the aerodynamic torque added by the wind gust exceeds a predetermined limit and the additional steps being disabled when the wind gust ends.

2. A method according to claim 1, wherein said pitch angle reference increment $\Delta\theta_{ref}$ is determined as a function of at least the aerodynamic torque excess $T_{exc}$ due to the wind gust and the torque sensitivity to the pitch angle $T_{sens}$.

3. A method according to claim 2, wherein said pitch angle reference increment $\Delta\theta_{ref}$ is also determined taking into account the expected generator speed increment $\Delta\Omega$ due to the wind gust and the closeness of the generator speed Ω to a predetermined threshold value.

4. A method according to claim 1, wherein said pitch angle reference increment $\Delta\theta_{ref}$ is provided/removed to/from the pitch control means depending on the value of a switch indicating the presence/absence of a wind gust depending on at least the values of the generator acceleration A and the generator speed Ω.

5. A method according to claim 4, wherein said pitch angle reference increment $\Delta\theta_{ref}$ is determined as a function of at least the aerodynamic torque excess $T_{exc}$ due to the wind gust and the torque sensitivity to the pitch angle $T_{sens}$.

\* \* \* \* \*